April 28, 1970     P. J. MURPHY     3,508,440
GOLF GAME
Filed July 24, 1967
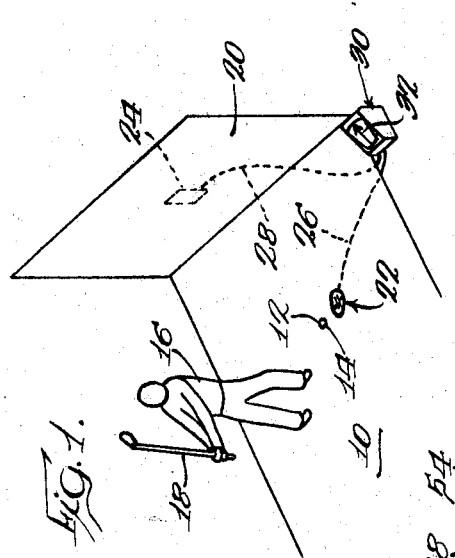
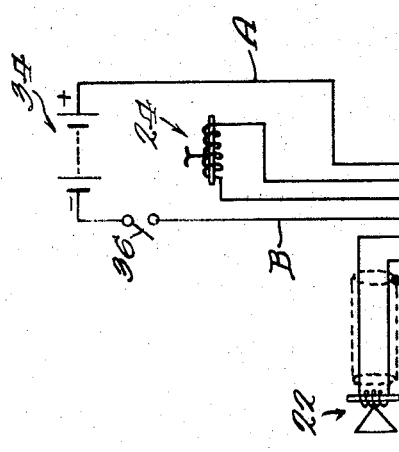
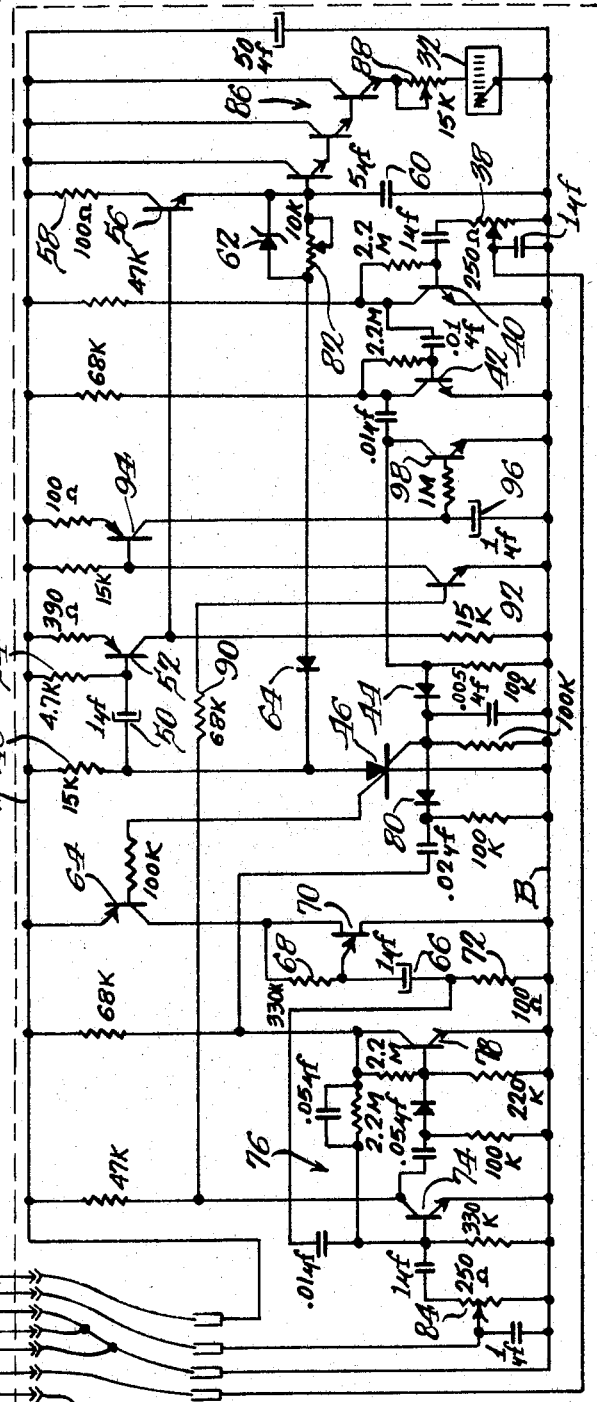
Inventor:
Patrick J. Murphy
By Hofgren, Wegner,
Allen, Stellman & McCord
Attys

United States Patent Office 3,508,440
Patented Apr. 28, 1970

3,508,440
GOLF GAME
Patrick J. Murphy, Muskegon, Mich., assignor to
Brunswick Corporation, a corporation of Delaware
Filed July 24, 1967, Ser. No. 655,450
Int. Cl. G01l 5/02
U.S. Cl. 73—379    15 Claims

ABSTRACT OF THE DISCLOSURE

A golf game including a tee, means for detecting when a ball has been hit from the tee, means for determining when a ball hit from the tee has passed a predetermined point spaced from the tee, means responsive to the detecting and determining means for computing the distance the shot would have traveled, and means responsive to the detecting means for resetting the computing means so that the same may compute the distance that the ball hit from the tee would have traveled.

BACKGROUND OF THE INVENTION

Many proposals have been made for an analog computer for golf games to compute the distance a ball hit from a tee would have traveled in free flight. Typically such games include a tee area and a target or screen spaced from the tee area towards which the ball is directed from the tee.

Most such prior art proposals rely on a means for detecting when the ball was struck from the tee together with a means spaced from the tee along the path that the ball will travel or associated with the target for determining when the ball has traveled to a predetermined point in its flight path. Means are typically provided to determine the time required for the ball to travel from the tee to the predetermined point, this quantity being a measure of velocity and in turn, a measure of the distance the shot would have traveled. The instant invention also relies upon this basic principle of operation.

While the prior art devices function satisfactorily in most situations, certain defects in the operation may be present. Typically, the sensors used in the prior art proposals involved vibration sensitive elements such as microphones or other transducers or photocell arrangements. When a microphone or vibration sensitive transducer is used, it has been found that oftentimes the operation of the computing circuit is erroneously initiated as when a golfer takes a practice swing and strikes the ball supporting surface setting up a vibration that is detected by the vibration sensitive transducer. Such vibrations may also be set up by extraneous loud noises. Where photocell detection is used in conjunction with a tee area, the vibration set up by a practice swing may on occasion cause the ball to fall from the tee to thereby cause a change in the condition of the photocell to erroneously initiate the operation of the computing circuit.

Such difficulties have in the past been solved in part by the use of both photocell and vibration sensing circuits which will not initiate operation of the computer unless changes in the condition of the photocell and the vibration are simultaneously detected. In other cases, automatic resetting systems have been used to reset the computing circuit in the event the ball is sensed leaving the tee but is not sensed at the predetermined point in its flight path within a predetermined time period which is generally set to be a period of time significantly longer than that required for the ball to traverse the distance. However, such devices have the disadvantage that when a false trigger has occurred, a golfer must wait for the predetermined time period to pass before resetting is initiated and, in the case of many such computing circuits, the resetting operation, usually involving the charging or discharging of capacitors, may add an additional wait before the shot may be taken. Another disadvantage found in the prior art proposals is that where the ball is misdirected by the golfer so that it does not pass through the predesignated flight path or does not strike a target thereby precluding the sensing of the ball at the predetermined point in its path. In such cases, the computer circuitry will have been energized in response to the striking of the ball at the tee and will continue to operate ad infinitum because the ball will never reach the predetermined point. The prior art proposals obviate this problem by automatically resetting the computer if the ball does not reach the predetermined point within the certain period in the same manner mentioned in the preceding paragraph. Of course, the same disadvantages are attendant.

SUMMARY OF THE INVENTION

It is the principal object of the invention to provide a new and improved golf game.

More specifically, it is an object of the invention to provide a new and improved computing circuit for use with golf games.

A further object is the provision of a golf game computing circuit that, upon the initiation of the flight of a ball from a tee area, immediately resets itself and thereafter performs a computing operation relative to the shot that caused the resetting so that no special sensing means or circuits are required to reset the computer following a false trigger for a shot that failed to pass a predetermined sensing point in a predetermined path of flight.

Another object is a golf game computing system including means for detecting when a ball has been hit from a tee, means for detecting when a ball has reached a predetermined location spaced from the tee, computing means responsive to the detecting means for computing the distance shot will travel, indicating means responsive to the computing means for indicating the computed distance, and means responsive to the first detecting means for resetting the computing means so that the compting means will compute the times properly without regard to the nature of the actions of a golf ball or the nature of shots previously hit that might affect the detecting means.

Another object is the provision of a golf game computing system such as that set forth in the preceding paragraph further including means responsive to the second named detecting means for precluding the first detecting means from affecting the computer on the resetting means for a predetermined time period.

A still further object is the provision of a golf game computing system such as that set forth above wherein the computing means includes a capacitor and the indicating means indicates the distance that shot would have traveled as the function of the charge on the capacitor, the resetting means being operative to initially charge the capacitor to a predetermined level and the computing means further including means for discharging the capacitor.

Other objects and advantages will become apparent from the following specification taken in conjunction with the accompanying drawings.

DESCRIPTION OF THE DRAWINGS

FIG. 1 is a perspective view of a golfer playing a golf game utilizing a computing circuit made according to the invention; and FIG. 2 is a schematic of the computing circuit.

DETAILED DESCRIPTION

One environment in which an exemplary embodiment of the invention may be used is illustrated in FIG. 1. Specifically, there is provided a tee area generally designated 10 and including a point 12 at which a ball 14 may be located to be hit therefrom by a golfer 16 with the club 18. Spaced from the tee 10 is a target 20 which the ball 14 will normally impact after being struck by the golfer 16.

The exemplary embodiment of the invention contemplates a tee and target arrangement along the general lines of that described in the copending application of Cornell et al., Ser. No. 542,414, filed Apr. 13, 1966, and assigned to the same assignee as the instant application although, if desired, the instant invention could be used in a somewhat more sophisticated indoor golf game such as that described in the copending application of Russell et al., Ser. No. 588,922, filed Oct. 24, 1966, and assigned to the same assignee as the instant application.

As described in the aforementioned Cornell et al. application, the distance that a ball 14 would have traveled in free flight had it not encountered the target 20 is computed by determining when the ball 14 left the tee point 12 and when the ball subsequently impacted on the target 20. To provide for such detection, a conventional microphone generally designated 22 is located adjacent the tee point 12 to pick up the sound of the club 18 as it strikes the ball 14. A vibration sensitive transducer 24 is mounted on the target in any suitable manner to detect vibration of the target 20 in response to the ball 14 impacting thereagainst. By means of cables 26 and 28, the electrical signals generated by the microphone 22 and the vibration sensitive transducer 24, respectively, are conducted to a computing circuit enclosed within a housing generally designated 30 and including a distance indicating meter 32.

Were the system disclosed in the above mentioned Russell et al. application to be used, the signal generated by the vibration sensitive transducer 24 would be replaced by a signal generated by the photocell arrays in the same manner disclosed in said application.

Turning now to FIG. 2, the computer circuitry enclosed within the housing 30 and the manner in which it operates the meter 32 will be described. In series with a battery 34 (which could be replaced by a suitable rectifier if desired) is an off-on switch 36. One side of the battery 34 is connected to power line designated A while the side of the battery 34 to which the switch 36 is connected is connected to a power line B. The power lines A and B serve to provide electrical energy from the battery 34 to the remainder of the computing system whenever the switch 36 is closed to energize the system.

One pole of the microphone 22 is connected to the power line B that is one pole of the vibration sensitive transducer 24. The other side of the microphone 22 is connected to the wiper of a potentiometer 38 which has one side thereof connected to line B and the other side thereof capacity coupled to the base of a transistor 40. As a result, the transistor 40 will be turned on and by means of a capacity coupling between the collector of the transistor 40 and the base of a transistor 42, the latter will be turned off thereby generating a positive pulse on a lead capacity coupled between its collector and a diode 44. The positive pulse will be passed by the diode 44 to the cathode gate of a silicon controlled switch 46 which is connected between the lines A and B through a resistor 48. As a result, the silicon controlled switch will begin to conduct.

A capacitor 50 connected between the junction of the resistor 48 and the anode of the silicon controlled switch 46 and the base of a transistor 52 will begin to charge and will turn the transistor 52 on. A resistor 54 connected to the base of the transistor 52 and to the line A is selected such that the capacitor 50 will charge in about two milliseconds. When the charging of the capacitor is completed, the transistor 52 will be turned off.

While the transistor 52 is conducting, a connection from its collector to the base of a transistor 56 will turn the latter fully on. The emitter-collector circuit of the transistor 56 includes a resistor 58 and a capacitor 60. The arrangement is such that the capacitor 60 is fully charged in the short period of time that the transistor 56 is turned on which will be equal to the time that the transistor 52 is turned on. The voltage applied to the capacitor 60 is limited by a Zener diode having its cathode connected to the junction of the capacitor 60 and the transistor 56 and its anode connected through a diode 64 to the anode of the silicon controlled switch 46. As will be seen, the charge on the capacitor 60 when the computer cycle is completed is a measure of the distance the ball would have traveled had it not encountered the target 20.

When the silicon controlled switch 46 was initially turned on, the resultant drop in the potential at its anode gate causes a transistor 64 to conduct. As a result, a capacitor 66 will begin to charge through a resistor 68 and, when the potential at their common junction reaches a predetermined level, a unijunction transistor 70 will be fired whereupon the capacitor 66 will discharge through the unijunction transistor 70 and a resistor 72.

The discharging of the capacitor 66 causes a strong negative pulse to be generated at its junction with the resistor 72 which is capacity coupled to the base of one transistor 74 of an amplifier, generally designated 76, which additionally includes a second transistor 78. As will be apparent from the drawings, the amplifier 76 is in actuality a monostable multivibrator and in its stable state, the transistor 74 will be conducting while the transistor 78 will be turned off. The pulse turns off the transistor 74 thereby turning the transistor 78 on and as a result, the cathode gate of the silicon controlled switch 46 is subjected to a pulse that is negative with respect to the potential of power line B, thereby turning the silicon controlled switch off.

When the silicon controlled switch 46 was initially turned on, it provided a discharge path including the diode 64 and a variable resistor 82 for the capacitor 60. Thus, while the capacitor 60 was charged to a predetermined level when the transistor 56 was turned on and which occurred during the first two milliseconds following the striking of the ball 14 at the tee 10, after the transistor 56 is turned off, the capacitor 60 will begin to discharge through the variable resistor 82, the diode 64 and the silicon controlled switch 46 until such time as the silicon controlled switch 46 is turned off. As mentioned previously, the silicon controlled switch 46 may be turned off when the unijunction transistor 70 fires to cause capacitor 66 to discharge. This portion of the circuitry causes the discharging of the capacitor 60 to an arbitrary level for purposes as will be seen hereinafter.

In most instances, the stopping of the discharging of the capacitor 60 by the turning off of the silicon controlled switch 46 will occur before the latter is turned off by action of the unijunction transistor 70. When the ball 14 impacts the target 20, the vibrations imparted to the latter are picked up by the vibration sensitive transducer 24 which, it will be recalled, has one pole connected to the line B. The other pole of the vibration sensitive transducer 24 is connected through a variable resistor 84 which is capacity coupled to the base of the transistor 74 of the amplifier 76. Thus, when the vibration sensitive transducer 24 generates a signal in response to the sensing of the vibration caused by the ball impacting against the target 20, the amplifier 76 will be turned off in the manner previously described in conjunction with the unijunction transistor and the capacitor 66 to thereby shut off the silicon controlled switch 46.

When the silicon controlled switch 46 is shut off in this manner, the charge remaining on the capacitor 60 will be dependent upon the time elapsed between the turning on of the silicon controlled switch 46 in response to the signal generated by the microphone 22 and the time of turning off of the silicon controlled switch 46 in response to the signal generated by the vibration sensitive transducer 24. In other words, the time required for the ball to travel between the tee point 12 and the target 20 will determine the charge remaining on the capacitor 60.

In order to read the charge remaining on the capacitor 60, a Darlington connected emitter follower amplifier, generally designated 86, has its input connected to the common junction of the capacitor 60 and the variable resistor 82. The output of the Darlington connected emitter follower 86 powers the distance indicating meter 32 through a variable resistor 88.

The use of an emitter follower amplifier for reading the charge on the capacitor 60 is highly desirable in that the emitter follower has an extremely high input impedance and thus can read the capacitor 60 without significantly discharging the latter.

The meter 32 may be a standard microampere meter and the deflection of the pointer thereof will be in direct proportion to the charge remaining on the capacitor 60. Thus, by virtue of the circuitry used, the meter 32 may be calibrated for distance from zero to the maximum distance measurable with the pointer moving up the scale for increased charge on the capacitor 60 as opposed to prior art systems wherein the pointer will dwell at the maximum distance obtainable when the meter 32 is not energized.

In certain situations depending upon the nature of the arrangement between the tee 10 and the target 20, it may be desirable to insure that vibrations caused by the ball hitting the target will not cause the microphone 22 to generate a second signal to erroneously start a new timing cycle. To serve this end, the collector of the transistor 74 is connected through a resistor 90 to the base of a transistor 92 which will be turned on whenever the transistor 74 is turned off, which it will be recalled, occurs whenever the ball strikes the target 20. The turning off of the transistor 92 causes a transistor 94 to be turned on fully to charge the capacitor 96. The charge on the capacitor 96 is sufficient to cause a transistor 98 to conduct for a short period of time and as the transistor 98 has its emitter-collector circuit connected between the power line B and the anode of the diode 44, any positive goings pulse generated by the switching off of the transistor 42 will be directed to line B to preclude the silicon controlled switch 46 from being turned on.

Where the arrangement of the tee 10 and the target 20 is along the lines of that disclosed in the above identified Cornell et al. application, and requires the ball to be returned at a relatively low velocity from the target 20 for spin determination, the RC characteristics of the circuits including the capacitor 96 should be arranged to turn the transistor 98 on for a period of about three seconds such that the bouncing of the ball upon its return to the tee area 10 will have terminated so that the microphone 22 cannot be triggered thereby.

Of course, if the physical construction of the target 20 and the tee 10 is not such that vibrations of the target will be transmitted to the tee 10, or if the circuit is used in conjunction with a cam other than that described in the above cited Cornell et al. application, the circuit including the transistors 92, 94 and 98 may be omitted.

Similarly, the circuit including the transistor 64, the unijuction transistor 70, the resistors 78 and 72 and the capacitor 66 may be omitted if it is not desired to reflect at least a minimum reading on the meter 32 after each shot. In this respect, it will be apparent that the sole function of the just described circuit is to stop the discharge of the capacitor 60 after a predetermined time period and typically the time involved will be such that a small charge will remain on the capacitor 60 which will be indicated on the meter 32 as a shot traveling only a few yards. Of course, such a yardage designation is arbitrary but is desirable when the apparatus is used in the playing of a golf game as opposed to being merely used for practice. Thus, depending upon the factors involved, the above mentioned circuit may either be included or omitted as desired.

From the foregoing, it will be apparent that the invention provides a distance determining circuit for use in golf games that provides significant advantages over prior art constructions, particularly with respect to false triggering of the sensor at a tee and in the case where a valid shot fails to strike a target or pass through a predetermined flight path wherein its presence may be sensed.

Additionally, the unique circuitry provides a significant advantage in that the distance the shot would have traveled is directly proportional to the charge remaining on a capacitor and thus a meter for reading the charge on the capacitor may be calibrated directly and linearly rather than inversely and/or nonlinearly.

As is well known, a capacitor discharging through a constant resistance will not discharge linearly. Rather, the charge remaining on a capacitor in such a case at various times in the course of discharging will represent a asymtotic curve. It has also been discovered that the distance a golf ball will travel is an asymptotic function of its initial velocity.

Because the two sensors employed in the instant invention are spaced a relatively short distance, the velocity of the ball will not decay significantly between the two sensors due to the factor of drag, and thus the time period defined by the sensing of the ball being hit from the tee and the sensing of the ball at a predetermined point in its flight path will, if the distance between the tee and the point is known, be an accurate measure of the initial velocity of the ball.

By performing field tests wherein balls are struck at varying initial velocities and the distance the shot actually travels is measured, actual distance has been correlated with the initial velocity of the shot, the distance a shot would travel has been correlated with the time required for the ball to pass from the tee to the predetermined point in its flight path. As a result, it has been found that the asymptotic curve representing the charge remaining on the capacitor 60 for any given period of discharge closely matches the asymptotic curve that represents the correlation between the distance the ball will travel on an actual course and the time required for a ball to pass from the tee to a point spaced therefrom a short distance.

By means of eliminating the time factor the charge remaining on the capacitor may be correlated with the distance a shot would travel, and it has been found that the resulting relation is totally linear for any shot hit that would travel 50 yards or more on an actual course. Furthermore, there is virtual linearity for any shot hit that would travel 35–50 yards while some deviation from linearity is encountered for shots that would travel from zero to about 35 yards.

The linearity of the foregoing correlation is incorporated in the computing circuit illustrated and with the component values illustrated, the circuit response is virtually linear. Such a response and the fact that virtually every shot hit by a golfer will travel at least 35 yards, permits the meter 32 to be calibrated virtually linearly. This feature, of course, is of great economic significance in the mass production of such computing systems and as a result, each computing system need not have its meter 32 scaled on the basis of empirical data determined by use of the particular system. Rather, the scaling on the meters 32 may be mass-produced and proper correlation achieved by relatively simple adjustments of the variable resistor 88 and/or adjustment of the variable resistor 82. In this respect, the variable resistor 82 may be made fixed if desired and correlation may be achieved solely through the use of the variable resistor 88.

Additionally, the relative linearity in meter scaling permits a golfer to quickly ascertain distance by a glance of the meter which is not possible with prior art nonlinearly scaled meters unless such meters are of an unduly large size.

Furthermore, because of the match between the aforementioned asymptotic curves, there is no need to provide circuit elements that will cause the capacitor to charge and/or discharge linearly or to provide a capacitor having a large capacitance and use only a small fraction of the capacitance in order to approximate linearity as has been done in many prior art devices. Additionally, the use of the circuit including the Zener diode 62 to limit the voltage applied to the capacitor 60 permits the extended use of conventional batteries for powering the device without affecting the accuracy of the system. In other words, because the Zener diode limits the voltage that may be applied to the capacitor 60, the limited voltage may be selected to be significantly below the voltage applied to the system by a fresh battery thereby permitting the battery to be used for a significant period even though as the period of use increases, its voltage output will decrease significantly.

The foregoing detailed description has been given for clearness of understanding only and no unnecessary limitations should be understood therefrom as modifications will be obvious to those skilled in the art.

I claim:

1. In a golf game including a target and a tee area spaced from the target from which a ball may be hit along a flight path toward the target, the combination comprising: means for detecting when a ball has been hit from the tee and for providing a first signal indicative thereof; means for determining when the ball has reached a predetermined location spaced from the tee and in the flight path and for providing a second signal indicative thereof; computing means for receiving said first and second signals and for providing information relative to a parameter of the trajectory of the flight of the ball hit from the tee; means responsive to said computing means for indicating said information to a golfer; and means for receiving said first signal for resetting said computing means upon receipt of said first signal whereby said computing means will be reset to thereafter correctly compute said information without regard to the nature of the actions of a golfer or the nature of shots previously hit from the tee.

2. The invention of claim 1 wherein said computing means comprises a capacitor in a discharging circuit and switch means for closing said discharging circuit in response to receipt of said first signal and for opening said discharging circuit in response to receipt of said second signal whereby the charge remaining on said capacitor following receipt of said second signal is related to the distance the ball would have traveled had it not encountered said target; said resetting means comprising means for rapidly charging said capacitor in response to receipt of said first signal.

3. The invention of claim 2 wherein said indicating means comprises a meter driven by an amplifier connected to said capacitor.

4. The invention of claim 2 wherein said charging means comprises a charging circuit energized in response to the closing of said switch means and timing means for deenergizing said charging circuit shortly after energization thereof.

5. The invention of claim 1 further including means responsive to said second signal for precluding said computing means from receiving a subsequent first signal.

6. The invention of claim 5 wherein said precluding means includes timing means operative for a predetermined time after said second signal is provided.

7. In a golf game including a tee from which a golf ball may be hit along a flight path, the combination comprising: first means for detecting when a ball has been hit from the tee; second means for detecting the presence of a ball in an area including the flight path and spaced from the tee; computing means responsive to said detecting means for computing the distance the ball would travel, said computing means including a capacitor; indicator means responsive to said computing means for indicating the distance computed by said computer means; means responsive to said first detecting means for rapidly charging said capacitor to a predetermined level when a ball has been hit from the tee; means responsive to said first detecting means and operative after the charging of said capacitor for initiating discharging of said capacitor; and means responsive to said second detecting means for stopping the discharging of said capacitor whereby the charge remaining on said capacitor following stopping of the discharge of the same is related to the distance a ball hit from the tee would have traveled.

8. The invention of claim 7 wherein said charging means comprises a first switch in series with said capacitor and a source of electrical energy; a discharging circuit connected across said capacitor and including a second switch in series therewith; said discharge initiating means including means for closing said second switch; and said discharge stopping means including means for opening said second switch.

9. The invention of claim 8 wherein said second switch comprises a silicon controlled switch.

10. The invention of claim 7 wherein said discharge initiating means and said discharge stopping means are operative to close and open, respectively, a switch in a discharging circuit connected across said capacitor.

11. The invention of claim 7 further including means responsive to said second detecting means for precluding said computing means from responding to said first detecting means for a predetermined time period.

12. In a golf game, a system for computing the distance a ball hit from a tee would travel in a flight path comprising first means for detecting when a ball is hit from a tee; second means adapted to be spaced from the tee for detecting when a ball hit from the tee has passed a predetermined point in the flight path; a source of electrical power; a silicon controlled semiconductor having an anode, a cathode, and a cathode gate, and electrically associated with said source of power; means interconnecting said first detecting means to said cathode gate and operative to cause said semiconductor to conduct; means in circuit with said semiconductor and said second detecting means and operative to halt conduction of said semiconductor; a capacitor; resistive first circuit means connecting said opposite sides of said capacitor to said anode and to said cathode whereby said capacitor may discharge through said semiconductor so that the charge remaining on the capacitor following the halting of conduction of said semiconductor is related to the distance the ball would have traveled; second circuit means connecting said capacitor across said source of power to charge rapidly said capacitor to a predetermined level; and timer controlled switch means in said second circuit for closing the same for a predetermined time period and responsive to said first detecting means.

13. The invention of claim 12 further including shunting circuit means for said interconnecting means and including switch means closeable in response to operation of said second detecting means.

14. The invention of claim 12 further including timer means operative in response to said first detecting means for halting the conduction of said semiconductor after a predetermined time period.

15. The invention of claim 12 wherein said timer controlled switch means includes third circuit means associated with one of the anode and cathode of said semiconductor whereby said timer controlled switch means will be operative when said semiconductor is initially caused to conduct.

References Cited

UNITED STATES PATENTS

| | | | |
|---|---|---|---|
| 2,102,166 | 12/1937 | Roberts | 73—13 |
| 2,825,569 | 3/1958 | Alvarez | 273—186 |
| 3,091,466 | 5/1963 | Speiser | 273—184 |
| 3,194,562 | 7/1965 | Speiser | 273—184 |

CHARLES A. RUEHL, Primary Examiner

U.S. Cl. X.R.

235—151.32; 273—184